(12) United States Patent
Taguchi et al.

(10) Patent No.: US 7,356,721 B2
(45) Date of Patent: Apr. 8, 2008

(54) MICROCOMPUTER AND EMULATION APPARATUS

(75) Inventors: Shinichiro Taguchi, Nagoya (JP); Hideaki Ishihara, Okazaki (JP); Yoshinori Teshima, Toyota (JP); Naoki Ito, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 443 days.

(21) Appl. No.: 11/007,298

(22) Filed: Dec. 9, 2004

(65) Prior Publication Data

US 2005/0188131 A1 Aug. 25, 2005

(30) Foreign Application Priority Data

Feb. 24, 2004 (JP) .............................. 2004-047803

(51) Int. Cl.
G06F 1/12 (2006.01)
G06F 9/455 (2006.01)

(52) U.S. Cl. ..................... 713/400; 713/401; 703/23
(58) Field of Classification Search ................ 713/400, 713/401; 703/23, 24, 27
See application file for complete search history.

(56) References Cited

U.S. PATENT DOCUMENTS 5,727,217 A * 3/1998 Young ........................ 710/260
5,864,694 A * 1/1999 Yamashiro .................... 703/25
5,889,978 A * 3/1999 Jayakumar .................... 703/27

FOREIGN PATENT DOCUMENTS

JP       03134783 A   *  6/1991
JP       A-5-334460      12/1993

* cited by examiner

Primary Examiner—Suresh K Suryawanshi
(74) Attorney, Agent, or Firm—Posz Law Group, PLC

(57) ABSTRACT

A single-chip microcomputer includes a logic circuit, a CPU and a flip-flop for synchronizing an interrupt-request signal, which is supplied by the logic circuit to the CPU, based on a clock signal. A multi-chip emulation apparatus comprises a peripheral evaluation chip, a CPU evaluation chip and a device, which are used for emulating functions of the logic circuit, the CPU and the flip-flop respectively. When the multi-chip emulation apparatus is used for emulating functions of the single-chip microcomputer in the development, the device for emulating functions of the flip-flop synchronizes the interrupt-request signal to absorb a delay time incurred by the interrupt-request signal due to a physical distance between the peripheral evaluation chip and the CPU evaluation chip so that an interrupt-handling timing in the emulation matches an interrupt-handling timing in the real operation of the single-chip microcomputer.

14 Claims, 6 Drawing Sheets

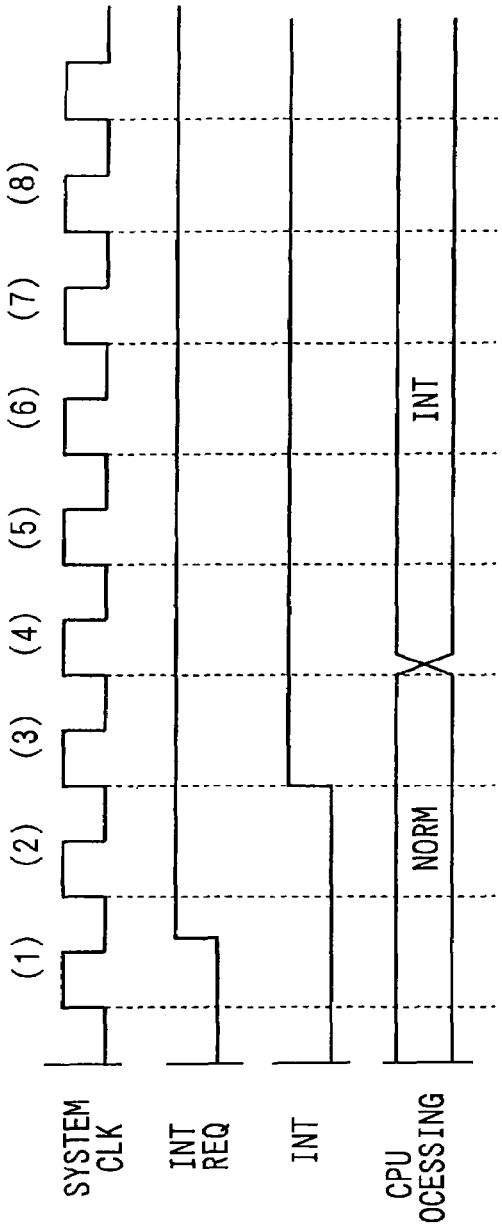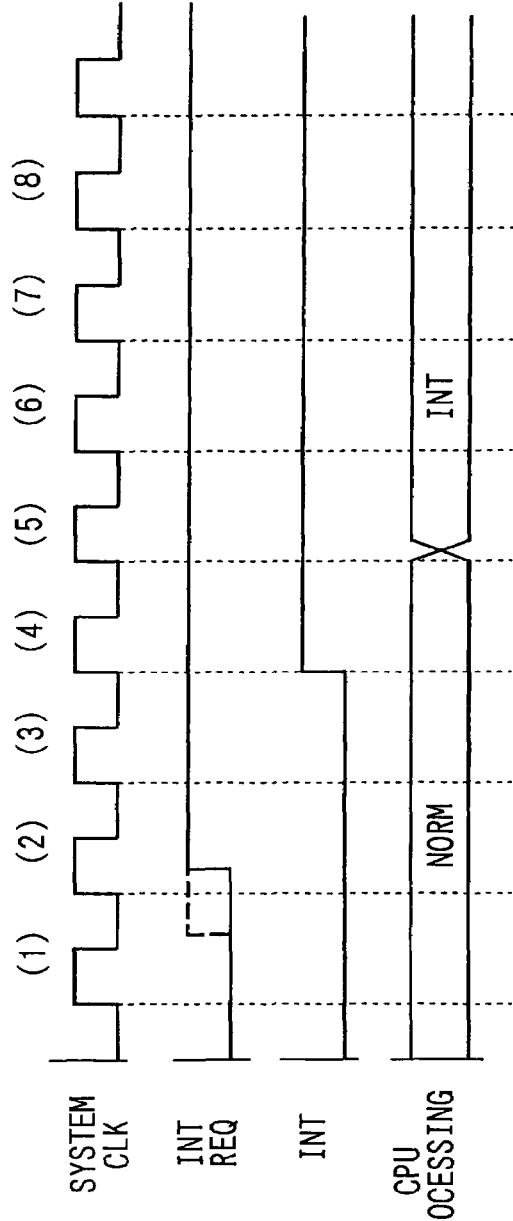

US 7,356,721 B2

MICROCOMPUTER AND EMULATION APPARATUS

CROSS REFERENCE TO RELATED APPLICATION

This application is based upon, claims the benefit of priority of, and incorporates by reference the contents of, Japanese Patent Application No. 2004-47803 filed on Feb. 24, 2004.

FIELD OF THE INVENTION

The present invention relates to a microcomputer built in a single chip including a CPU and a plurality of peripheral circuits and also relates to an emulation apparatus used in development of the single-chip microcomputer.

BACKGROUND OF THE INVENTION

The single-chip microcomputer comprises a CPU and a plurality of peripheral circuits, which are constructed on the same chip as the CPU. As the number of processing functions to be executed by the single-chip microcomputer increases, the number of peripheral circuits incorporated in the chip needs to be raised as well. In addition, the peripheral circuits incorporated in the chip also vary in dependence on the application of the single-chip microcomputer.

In development using the single-chip microcomputer, an emulation apparatus is used for emulating functions of the microcomputer. In order to keep up with increases in peripheral-circuit count and variations of the peripheral circuits with a high degree of flexibility, the emulation apparatus is in some cases designed into a multi-chip configuration comprising different semiconductor chips serving as a portion for emulating functions of the CPU and a portion for emulating functions of the peripheral circuits. Japanese Patent Laid-open No. Hei5-334460 referred to hereafter as patent reference 1 discloses a typical configuration of such an emulation apparatus.

If the multi-chip emulation apparatus for emulating functions of a single-chip microcomputer 1 is designed into a multi-chip configuration, however, a problem like one described below is raised. Assume that the single-chip microcomputer 1 comprises a CPU 2, a peripheral circuit 3, and an interrupt control circuit 4 as shown in FIG. 5. In the single-chip microcomputer 1, the peripheral circuit 3 makes a request for an interrupt and supplies the request to the interrupt control circuit 4 with a timing in a clock cycle (1) of timing charts shown in FIG. 6B. In this case, the interrupt control circuit 4 outputs a selected interrupt-request signal INT to the CPU 2 with a timing at the beginning of a clock cycle (3) as shown in FIG. 6C. As shown in the timing charts of FIGS. 6A to 6D, the timing to output the selected interrupt-request signal INT to the CPU 2 lags behind the timing to supply the request for an interrupt to the interrupt control circuit 4 by about 1 clock cycle. Then, the CPU 2 starts an interrupt-handling process at the beginning of a clock cycle (4) as shown in FIG. 6D.

Assume a case in which a multi-chip emulation apparatus 5 for emulating this single-chip microcomputer 1 has a configuration shown in FIG. 7. As shown in the figure, the multi-chip emulation apparatus 5 comprises a CPU 6, a peripheral-circuit chip 7 and an interrupt-controller chip 8, which are constructed as chips independent of each other. These chips for the CPU 6, the peripheral-circuit chip 7, and the interrupt-controller chip 8 respectively emulate functions of the CPU 2, the peripheral circuit 3, and the interrupt control circuit 4, which are employed in the single-chip microcomputer 1.

Let the multi-chip emulation apparatus 5 emulate a state in which the peripheral circuit 3 makes a request for an interrupt and supplies the request to the interrupt control circuit 4 with a timing in a clock cycle (1) as indicated by a dashed line in timing charts shown in FIG. 8B. However, the peripheral-circuit chip 7 supplies the request to the interrupt-controller chip 8 with a timing in a clock cycle (2) as indicated by a solid line in timing charts shown in FIG. 8B. The timing indicated by the solid line lags behind the timing indicated by the dashed line by a time delay caused by a wire between the chip of the peripheral-circuit chip 7 and the chip of the interrupt-controller chip 8.

In this case, since the interrupt-controller chip 8 recognizes the request for an interrupt in a clock cycle (3), the interrupt-controller chip 8 outputs a selected interrupt-request signal INT to the CPU 6 with a timing in a clock cycle (4) as shown in FIG. 8C. As a result, the CPU 6 starts interrupt-handling at a clock cycle (5) as shown in FIG. 8D. These timings shown in FIGS. 8A to 8D for the multi-chip emulation apparatus 5 are different from those shown in FIGS. 6A to 6D for the single-chip microcomputer 1 without such a time delay.

Accordingly, the interrupt-handling timing in the multi-chip emulation apparatus 5 is not compatible with the interrupt-handling timing, with which the single-chip microcomputer 1 actually operates, resulting in fear of disagreement between the processing timing recognized by the emulation and the timing with which the single-chip microcomputer 1 actually carries out the processing.

SUMMARY OF THE INVENTION

In view of the above-discussed problem, it is thus an object of the present invention to provide a single-chip microcomputer allowing compatibility of an interrupt-handling timing to be established between an emulation and a real operation even if an emulation apparatus used in development has a multi-chip configuration and to provide the multi-chip emulation apparatus for emulating functions of the single-chip microcomputer.

According to a first aspect, a microcomputer includes interrupt-request signal synchronization means for synchronizing an interrupt-request signal generated by any one of a plurality of peripheral circuits based on a clock signal and outputting the synchronized interrupt-request signal to a CPU. By having such a configuration, timing between occurrence of an interrupt at an interrupt origin and the arrival of the synchronized interrupt-request signal at the CPU can be prescribed by the clock signal so that the following effects can be exhibited.

An emulation apparatus for emulating functions of the microcomputer has a configuration in which functions of the microcomputer are apportioned to a plurality of chips. Thus, in this configuration, when a chip that is emulating functions of a peripheral circuit outputs an interrupt-request signal, the signal will arrive at a chip that is emulating functions of the CPU at a later time. At that time, the period of time between the generation of the interrupt-request signal by the chip emulating functions of the peripheral circuit and the arrival of the signal at the chip emulating functions of the CPU is referred to as a delay time, which inevitably becomes longer than the similar period of time in a real operation of the microcomputer due to the distance between the locations of the chip emulating functions of the peripheral circuit and the chip emulating functions of the CPU.

Even if the delay time has a value that cannot be ignored, an interrupt-request signal synchronization means in the emulation apparatus for emulating functions of the interrupt-request signal synchronization means in the microcomputer is capable of adjusting the interrupt-handling timing in order to absorb the delay time by synchronization based on a clock signal for synchronizing the interrupt-request signal so that an interrupt-handling timing in the emulation agrees with an interrupt-handling timing in a real operation of the microcomputer. Thus, the interrupt-handling timing in the emulation virtually matches the same timing in a real operation of the microcomputer. As a result, the processing timing matching the processing timing assumed in the development using the microcomputer can be reproduced in a real operation of the microcomputer, so that the development efficiency can be improved.

According to a second aspect, the microcomputer includes a frequency-varying means capable of varying the frequency of the clock signal used for synchronization in the interrupt-request signal synchronization means. Thus, the processing timing in a real operation can be adjusted with ease to a delayed state of the interrupt-handling timing in the emulation.

According to a third aspect, an emulation apparatus emulates functions of the microcomputer according to the first and second aspects, chips independent of each other are configured to emulate functions of the CPU employed in the microcomputer and functions of a plurality of peripheral circuits are also employed in the microcomputer. The chip emulating functions of an interrupt control circuit synchronizes an interrupt-request signal, which is generated by the interrupt control circuit itself or any other one of the peripheral circuits, based on a clock signal, and outputs the synchronized interrupt-request signal to the chip that is emulating functions of the CPU in the microcomputer. Thus, the emulation apparatus is also capable of adjusting the interrupt-handling timing by synchronization based on a clock signal so that the interrupt-handling timing in the emulation virtually matches the interrupt-handling timing in a real operation.

According to a fourth aspect, the emulation apparatus includes frequency-varying means capable of varying the frequency of the clock signal used for synchronization. Thus, an interrupt-handling timing in the emulation can be adjusted with ease.

BRIEF DESCRIPTION OF THE DRAWINGS

The above and other objects, features and advantages of the present invention will become more apparent from the following detailed description made with reference to the accompanying drawings. In the drawings:

FIGS. 6A to 6D show timing charts corresponding to those shown in FIGS. 4A to 4F;

FIGS. 8A to 8D show timing charts corresponding to those shown in FIGS. 3A to 3F.

DETAILED DESCRIPTION OF THE PREFERRED EMBODIMENTS

Figure 1:
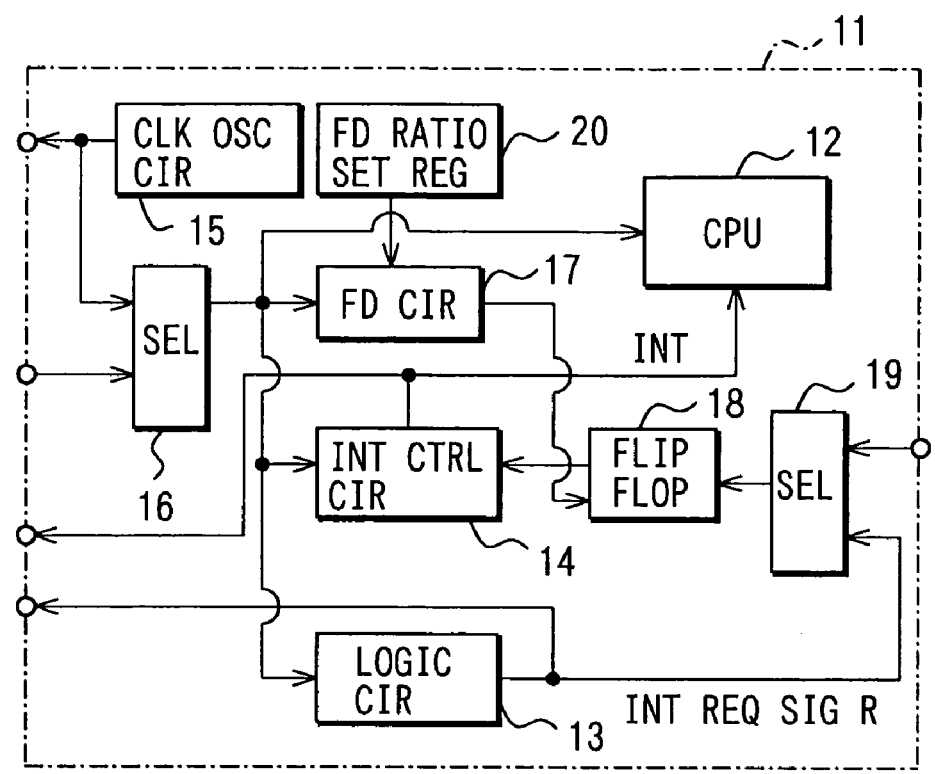
FIG. 1 is a block diagram of a single-chip microcomputer implemented according to a preferred embodiment.

An preferred embodiment will be explained by referring to FIGS. 1 to 4F as follows. FIG. 1 is a diagram showing the configuration of a single-chip microcomputer 11. The single-chip microcomputer 11 is designed to be used as a configuration component of a multi-chip emulation apparatus for debugging hardware or software of, for example, a control-object apparatus that employs the single-chip microcomputer 11 during a development stage.

Thus, the actual operation mode of the single-chip microcomputer 11 can be switched from a real-operation mode to an emulation mode or vice versa. The real operation mode is a mode for typically executing control with the single-chip microcomputer 11 embedded in the control-object apparatus mentioned above. On the other hand, the emulation mode is a mode, which is adopted when the single-chip microcomputer 11 operates as a configuration component of the emulation apparatus.

As shown in FIG. 1, the single-chip microcomputer 11 comprises central elements including a CPU 12, a peripheral circuit serving as a logic circuit 13 and another peripheral circuit serving as an interrupt control circuit 14. The logic circuit 13 can be any one of a plurality of peripheral circuits such as, for example, a UART or a DMA controller. A clock oscillation circuit 15 is an element for generating and outputting a system clock signal. The system clock signal is supplied to the CPU 12, the logic circuit 13, and the interrupt control circuit 14 via a selector 16.

When the single-chip microcomputer 11 must operate synchronously with a clock signal supplied by another chip in the emulation mode, the selector 16 selects the clock signal supplied by another chip in place of a system clock signal. The selection of the clock signal is controlled in accordance with a mode determined by an external pin.

A clock signal selected and output by the selector 16 is supplied to a clock input pin of a flip-flop 18 functioning as an interrupt-request signal synchronization means by way of a frequency division circuit 17 serving as a frequency-varying means. The flip-flop 18 synchronizes an interrupt-request signal received from a selector 19 based on a clock signal output by the frequency division circuit 17, and outputs the synchronized interrupt-request signal to the interrupt control circuit 14. The interrupt control circuit 14 selects one of interrupt-request signals generated by a plurality of interrupt originators in accordance with priority levels set in advance or a mask state set dynamically by the CPU 12, and outputs the selected interrupt-request signal to the CPU 12 as a selected interrupt-request signal INT.

When the microcomputer 11 operates in the real-operation mode, the selector 19 selects an interrupt-request signal output by the logic circuit 13. When the microcomputer 11 operates in the emulation mode, the selector 19 selects an interrupt-request signal output from another chip. The selection of the interrupt-request signal is controlled in accordance with a mode determined by the external pin in the same way as the selector 16. The frequency-division ratio of the frequency division circuit 17 is set by a frequency-division ratio set register 20 functioning as the frequency-varying means. The contents of the frequency-division ratio set register 20 can be updated by the CPU 12 to change the frequency-division ratio of the frequency division circuit 17.

It is to be noted that the logic circuit 13 outputs an external interrupt-request signal to the selector 19 in the real-operation mode but, in the emulation mode, on the other hand, an external chip is allowed to supply an external interrupt-request signal to the selector 19 if necessary. Thus the interrupt control circuit 14 supplies the interrupt-request signal INT selected by the selector 19 to the CPU 12 in the real-operation mode but, in the emulation mode, on the other hand, the external chip is allowed to supply the external interrupt-request signal INT selected by the selector 19 to the CPU 12 if necessary. In the same way, the clock oscillation circuit 15 outputs the system clock signal to the selector 16 in the real-operation mode but, in the emulation mode, on the other hand, an external chip is allowed to supply a clock signal to the selector 16.

Figure 2:
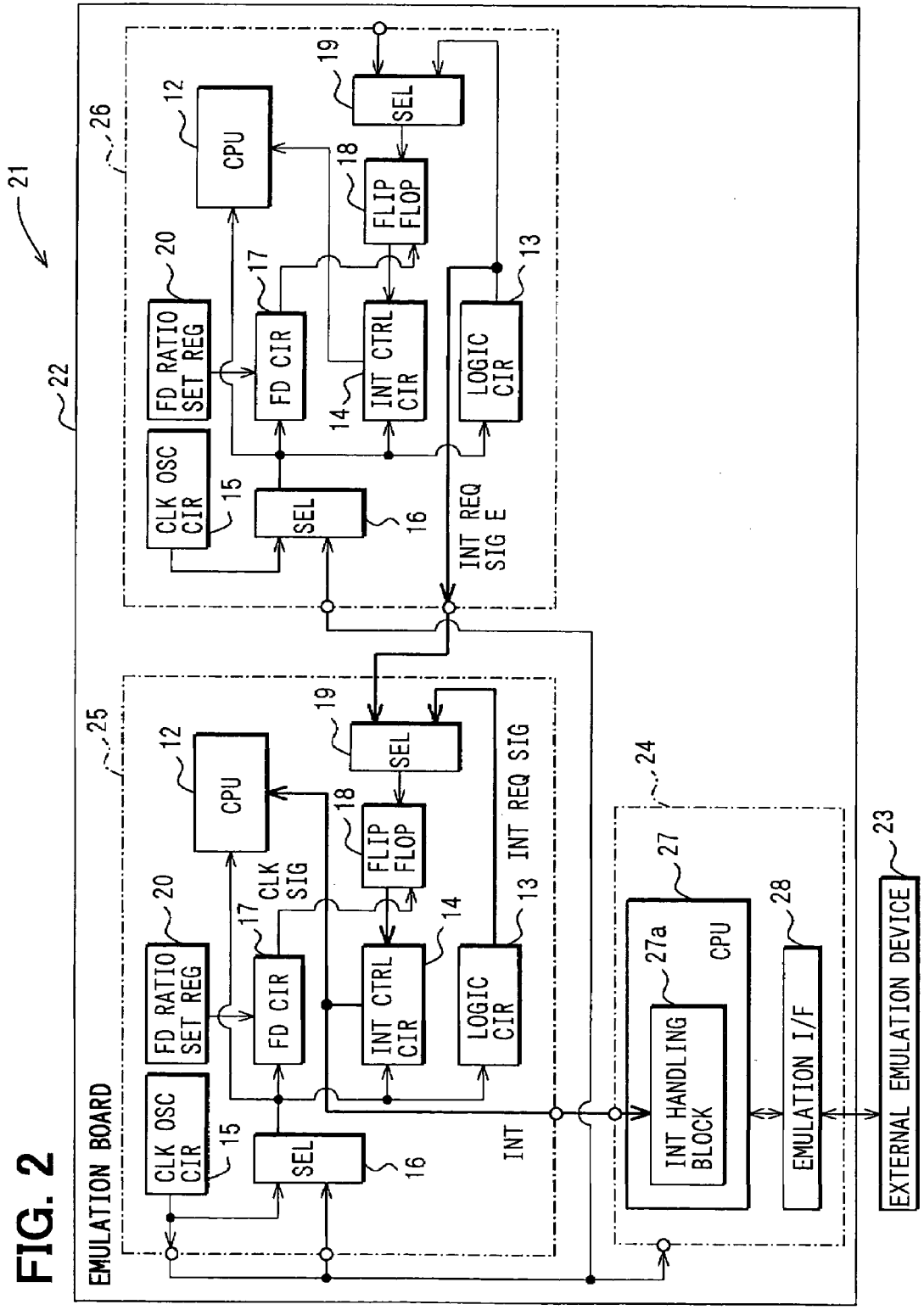
FIG. 2 is a block diagram of a multi-chip emulation apparatus for emulating functions of the single-chip microcomputer shown in FIG. 1.
Figure 3:
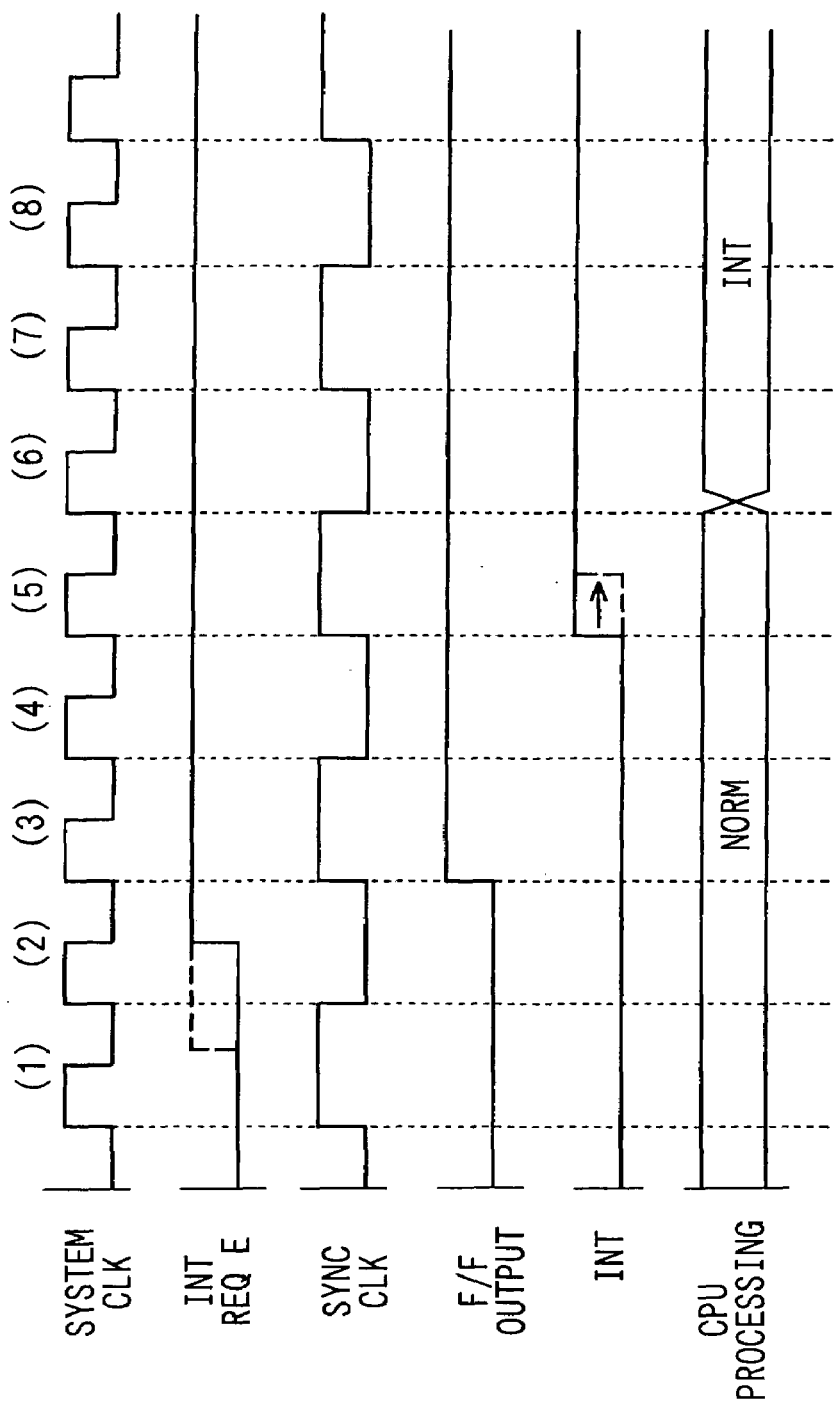
FIGS. 3A to 3F show timing charts for an evaluation board of the multi-chip emulation apparatus, on which an interrupt-request signal E generated by a logic circuit in a peripheral evaluation chip is supplied to a CPU evaluation chip via another peripheral evaluation chip.

FIG. 2 is a diagram showing the configuration of a multi-chip emulation apparatus 21 for emulating functions of the single-chip microcomputer 11. The multi-chip emulation apparatus 21 comprises an emulation board 22 and an external emulation apparatus 23. The emulation board 22 has a multi-chip configuration including a CPU evaluation chip 24 for emulating functions of the CPU 12, a peripheral evaluation chip 25 for emulating at least functions of the interrupt control circuit 14, and a peripheral evaluation chip 26 for emulating at least functions of the logic circuit 13. The CPU evaluation chip 24 serves as a CPU functional unit. The peripheral evaluation chip 25 is referred to hereafter as a first peripheral evaluation chip serving as a first peripheral functional unit. The peripheral evaluation chip 26 is referred to hereafter as a second peripheral evaluation chip serving as a second peripheral functional unit. The first and second peripheral evaluation chips 25 and 26 are configured so that the emulation board 22 emulates functions of the single-chip microcomputer 11 operating in the emulation mode.

The CPU evaluation chip 24 has a CPU 27 for carrying out emulation operations and an interface (I/F) 28 for carrying out communications with the external emulation apparatus 23. A clock signal generated by a clock oscillation circuit 15 in the first peripheral evaluation chip 25 is used as a system clock signal in the emulation board 22. The clock signal is also supplied to the CPU evaluation chip 24 and the second peripheral evaluation chip 26. The first peripheral evaluation chip 25 is set in a state of driving a selector 19 to select an interrupt-request signal generated by an external chip. The second peripheral evaluation chip 26 is wired to the first peripheral evaluation chip 25 so that a logic circuit 13 in the second peripheral evaluation chip 26 outputs an interrupt-request signal E to the first peripheral evaluation chip 25.

In the first peripheral evaluation chip 25, a frequency-division ratio set register 20 is set at such data that a frequency division circuit 17 operates at a frequency-division ratio of 2. With such a frequency-division ratio, the period of a synchronization clock signal in a flip-flop 18 is set at a value twice the period of the system clock signal. The first peripheral evaluation chip 25 is wired to the CPU evaluation chip 24 so that an interrupt control circuit 14 in the first peripheral evaluation chip 25 outputs a selected interrupt-request signal INT to the CPU evaluation chip 24.

In the CPU evaluation chip 24, an interrupt-handling block 27a embedded in the CPU 27 processes the selected interrupt-request signal INT.

It is to be noted that the selected interrupt-request signal INT is also supplied to a CPU 12 in the first peripheral evaluation chip 25 at the same time. However, the CPU 12 ignores an interrupt that does not need to be recognized in the emulation mode.

Next, referring to FIGS. 3A to 4F, effects of the embodiment will be discussed. FIGS. 3A to 3F show timing charts for a case in which an interrupt-request signal E generated by a logic circuit 13 in the second peripheral evaluation chip 26 on the emulation board 22 is supplied to the CPU evaluation chip 24 by way of the first peripheral evaluation chip 25. It is to be noted that the second peripheral evaluation chip 26 employing the logic circuit 13 corresponds to the peripheral circuit 3 in the configuration shown in FIG. 5.

The interrupt-request signal E generated in a clock cycle (1) in the second peripheral evaluation chip 26 as shown by a dashed line in FIG. 3B arrives on the input side of the flip-flop (F/F) 18 in the first peripheral evaluation chip 25 in a clock cycle (2) shifted from the clock cycle (1) by a first delay time between the rising edge of a dashed line and the rising edge of a solid line. The flip-flop 18 then synchronizes the interrupt-request signal E based on a period twice the period of the system clock signal, absorbing the first delay time, and outputs the synchronized interrupt-request signal to an interrupt control circuit 14 in a clock cycle (3) as shown in FIG. 3D.

Receiving the synchronized interrupt-request signal in a clock cycle (4), the interrupt control circuit 14 supplies a selected interrupt-request signal INT to the CPU evaluation chip 24 in a clock cycle (5) as shown in FIG. 3E. The CPU evaluation chip 24 also receives the selected interrupt-request signal INT after a second delay time between the rising edge of a solid line and the rising edge of a dashed line as shown in FIG. 3E. If this second delay time does not exceed 1 clock period, a CPU 27 in the CPU evaluation chip 24 starts an interrupt-handling process in a clock cycle (6) as shown in FIG. 3F. If this second delay time exceeds 1 clock period, the frequency of the clock signal can be lowered so that this second delay time does not exceed 1 clock period.

Figure 4:
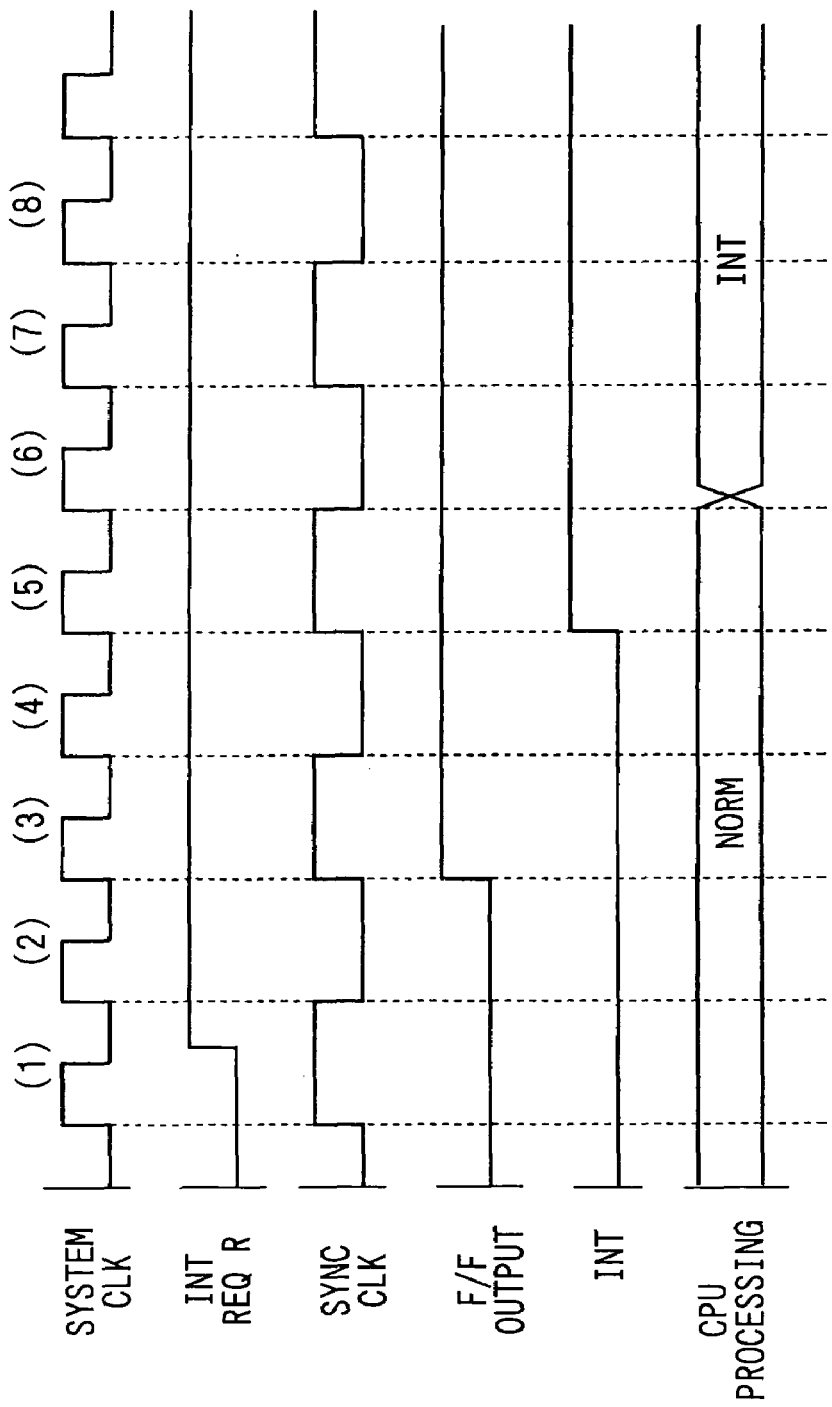
FIGS. 4A to 4F show timing charts corresponding to those shown in FIGS. 3A to 3F of operations carried out by the single-chip microcomputer in a real-operation mode.
Figure 5:
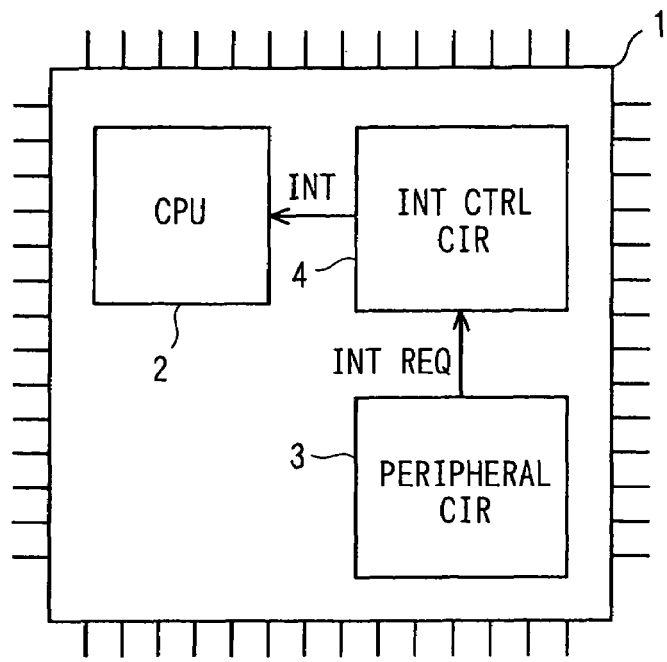
FIG. 5 is a diagram showing the configuration of a related art single-chip computer.
Figure 7:
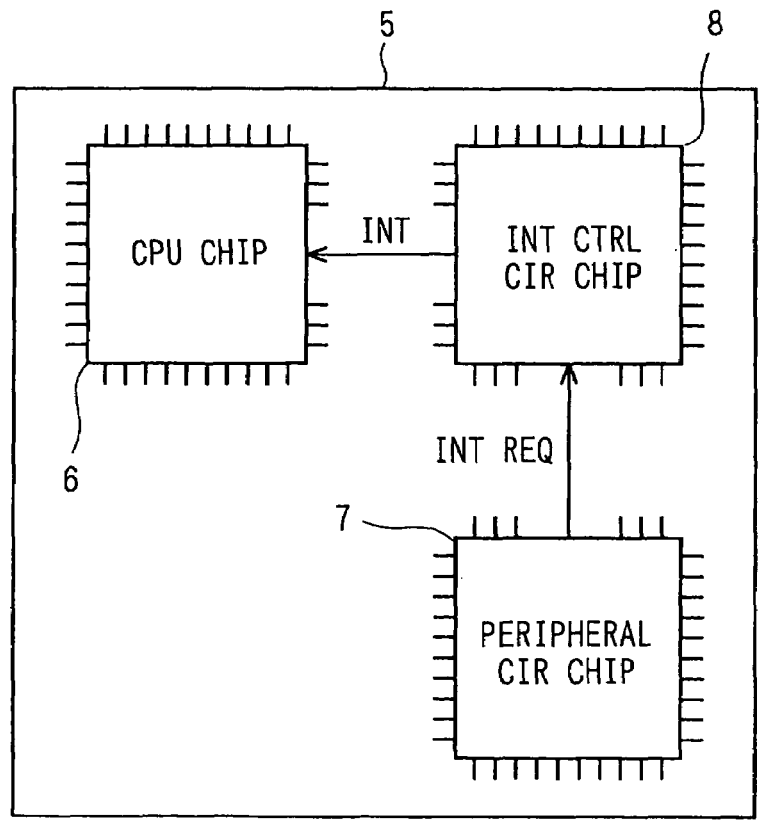
FIG. 7 is a diagram showing the configuration of a related art multi-chip emulation apparatus for emulating functions of the related art computer of FIG. 5.

FIGS. 4A to 4F show timing charts for operations carried out by the single-chip microcomputer 11 in the real-operation mode. In this case, the single-chip microcomputer 11 also writes such data in the frequency-division ratio set register 20 that the frequency-division ratio of the frequency division circuit 17 is set at 2. With the frequency-division ratio set at 2, when the logic circuit 13 makes an interrupt request R in a clock cycle (1), the interrupt-request signal representing the interrupt request R arrives on the input side of the flip-flop 18 almost without a time delay as shown in FIG. 4B. Then, in the same way as the emulation explained earlier by referring to FIGS. 3A to 3F, the flip-flop 18 synchronizes the interrupt-request signal R based on the period of a clock signal shown in FIG. 4C as a period twice the period of the system clock signal, and outputs the synchronized interrupt-request signal to an interrupt control circuit 14 in a clock cycle (3) as shown in FIG. 4D. Subsequent processing timings are the same as the emulation. That is to say, the CPU 12 starts an interrupt-handling process in a clock cycle (6). As is obvious from FIGS. 3A to 4F, the timings in the emulation mode match the timing in the real-operation mode.

As described above, in accordance with this embodiment, the single-chip microcomputer 11 includes the flip-flop 18 for synchronizing an interrupt-request signal from the logic circuit 13 based on a clock signal and outputting the synchronized interrupt-request signal to the CPU 12. Thus, as described above, when the multi-chip emulation apparatus 21 emulates functions of the single-chip microcomputer 11, the first peripheral evaluation chip 25 including a flip-flop 18 for emulating functions, synchronizes an interrupt-request signal generated by the logic circuit 13 in the second peripheral evaluation chip 26 to absorb a delay time between generation of the interrupt-request signal by the logic circuit 13 in the second peripheral evaluation chip 26 and the reception of the interrupt-request signal by the CPU evaluation chip 24 so that the interrupt-handling timing in the emulation matches the interrupt-handling timing in an actual operation of the single-chip microcomputer 11, even if the delay time cannot be ignored.

That is, in accordance with this embodiment, the interrupt-handling timing in an actual operation of the single-chip microcomputer 11 virtually agrees with the timing in the emulation. Thus, the same processing timings as processing timings assumed in development using the single-chip microcomputer 11 can be reproduced in real operations of the single-chip microcomputer 11. As a result, the development efficiency can be improved.

In addition, the frequency division circuit 17 in the single-chip microcomputer 11 can be used for changing the frequency of the clock signal for synchronization carried out by the flip-flop 18 in the single-chip microcomputer 11. Thus, the processing timing in real operations can be adjusted with ease for conformity with a delay state of the interrupt processing timing in the emulation.

In addition, in the multi-chip emulation apparatus 21 comprising the CPU evaluation chip 24, the first peripheral evaluation chip 25, and the second peripheral evaluation chip 26 as described above, the first peripheral evaluation chip 25 for emulating functions of the interrupt control circuit 14 also synchronizes an interrupt-request signal based on a clock signal and outputs the synchronized interrupt-request signal to the CPU evaluation chip 24 also serving as an emulation functional unit for emulating functions of the CPU 12. Thus, the multi-chip emulation apparatus 21 is also capable of adjusting the interrupt-handling timing by synchronization of the interrupt-request signal so that the interrupt-handling timing in the emulation virtually matches the same timing in a real operation. Moreover, the multi-chip emulation apparatus 21 is also capable of changing the frequency of the clock signal for synchronization so that the interrupt-handling timing in the emulation can be adjusted with ease.

In addition, the first peripheral evaluation chip 25 and the second peripheral evaluation chip 26, which are employed in the multi-chip emulation apparatus 21, are each implemented by the single-chip microcomputer 11. Thus, the peripheral circuits in the single-chip microcomputer 11 can be used to emulate a variety of functions of the first peripheral evaluation chip 25 and the second peripheral evaluation chip 26 with ease. As a result, the multi-chip emulation apparatus 21 can be configured with a high degree of efficiency.

The scope of the present invention is not limited to the above descriptions and the embodiments shown in the figures. That is, the following modifications and extensions are possible.

The present invention can have a configuration in which the frequency-division ratio of the frequency division circuit 17 can be determined by for example setting a dip switch serving as a frequency-varying means.

The value of the frequency-division ratio is not limited to 2. That is, the frequency-division ratio can be set at another value such as 4 or 8.

In addition, the frequency division circuit 17 can be provided only if required.

As the frequency-varying means, for example, a frequency synthesizer having a configuration employing typically a DPLL (Digital Phase Locked Loop) can be used.

The interrupt control circuit can also have a configuration in which an interrupt request made in clock cycle (2) is immediately recognized so that a selected interrupt-request signal INT can be output on the rising edge of the clock cycle (3).

The first and second peripheral evaluation chips 25 and 26 do not necessarily have the same configuration as the single-chip microcomputer 11. That is, the first and second peripheral evaluation chips 25 and 26 can each be a chip specially designed for communication purposes for example.

If adjustment of the timing only in the single-chip microcomputer is sufficient for making the interrupt-handling timing of the real operation match the same timing of the emulation, the interrupt-request signal does not have to be synchronized in the multi-chip simulation apparatus.

What is claimed is:

1. A single-chip microcomputer comprised of:
   a CPU;
   a plurality of peripheral circuits disposed on a singe-chip; and
   an interrupt-request signal synchronization means for synchronizing an interrupt-request signal from any one of the plurality of peripheral circuits based on a synchronization clock signal and supplying the synchronized interrupt-request signal to the CPU;
   wherein the interrupt-request signal synchronization means adjusts and absorbs a delay time of the interrupt-request signal between one of the plurality of peripheral circuits and another of the plurality of peripheral circuits based on the synchronization clock signal so that an interrupt-handling timing in an emulation matches an interrupt-handling timing in a real operation of the microcomputer.

2. A single-chip microcomputer according to claim 1, further comprising a frequency-varying means for varying the frequency of the synchronization clock signal.

3. A multi-chip emulation apparatus for emulating a single-chip microcomputer, comprising:
   a chip serving as a CPU functional unit; and
   a plurality of other chips serving as peripheral-circuit functional units, wherein at least one of the plurality of other chips includes an emulation functional unit for emulating at least functions of an interrupt control circuit in the single-chip microcomputer,
   wherein the emulation functional unit synchronizes an interrupt-request signal, which is generated by the emulation functional unit itself or any one of the peripheral-circuit functional units other than the emulation functional unit, based on a synchronization clock signal, and outputs the synchronized interrupt-request signal to the CPU functional unit, and
   wherein the emulation functional unit adjusts and absorbs a delay time of the interrupt-request signal between one of the plurality of peripheral-circuit functional units and another of the plurality of peripheral-circuit functional units based on the synchronization clock signal so that an interrupt-handling timing in the multi-chip emulation apparatus matches an interrupt-handling timing in a real operation of the single-chip microcomputer.

4. A multi-chip emulation apparatus according to claim 3, further comprising a frequency-varying means for varying the frequency of the synchronization clock signal.

5. A single-chip microcomputer according to claim 1, wherein the frequency of the synchronization clock signal is lower than the frequency of an operating clock signal of the peripheral circuit serving as an interrupt control circuit.

6. A multi-chip emulation apparatus according to claim 3, wherein the frequency of the synchronization clock signal is lower than the frequency of an operating clock signal of the emulation functional unit for emulating at least functions of an interrupt control circuit in the single-chip microcomputer.

7. A single-chip microcomputer according to claim 1, the wherein the synchronization clock signal has a synchronization frequency different than an operating frequency of an operating clock signal.

8. A multi-chip emulation apparatus according to claim 3, the wherein the synchronization clock signal has a synchronization frequency different than an operating frequency of an operating clock signal.

9. A microcomputer, comprising:
a central processing unit circuit;
a first peripheral circuit;
a second peripheral circuit;
an interrupt-request signal synchronization circuit configured to synchronize an interrupt-request signal from the first peripheral circuit to the second peripheral circuit based on a synchronization clock signal, and configured to supply to synchronized interrupt-request signal to the central processing unit circuit, and
wherein the synchronization clock signal has a synchronization frequency different than a system frequency of a system clock signal, wherein the interrupt-request signal synchronization circuit adjusts and absorbs a delay time of the interrupt-request signal between one of the first and second peripheral circuits and another of the first and second peripheral circuits based on the synchronization clock signal so that an interrupt-handling timing in an emulation matches an interrupt-handling timing in a real operation of the microcomputer.

10. A microcomputer according to claim 9, wherein the synchronization clock signal has a synchronization frequency lower than a system frequency of a system clock signal.

11. A microcomputer according to claim 9, further comprising a frequency-varying circuit for varying the synchronization frequency of the synchronization clock signal.

12. A microcomputer according to claim 11, wherein the frequency-varying circuit comprises a frequency division circuit that generates the synchronization clock signal by dividing a system frequency of the system clock signal by a frequency-division factor.

13. A microcomputer according to claim 9, wherein the first peripheral circuit, the second peripheral circuit, the central processing unit circuit, and the interrupt-request signal synchronization circuit are all formed on a single chip.

14. A microcomputer according to claim 9,
wherein the first peripheral circuit and the interrupt-request signal synchronization circuit are all formed on a first chip,
wherein the second peripheral circuit is formed on a second chip, and
wherein the central processing unit circuit is formed on a third chip.

* * * * *